No. 776,938. Patented December 6, 1904.

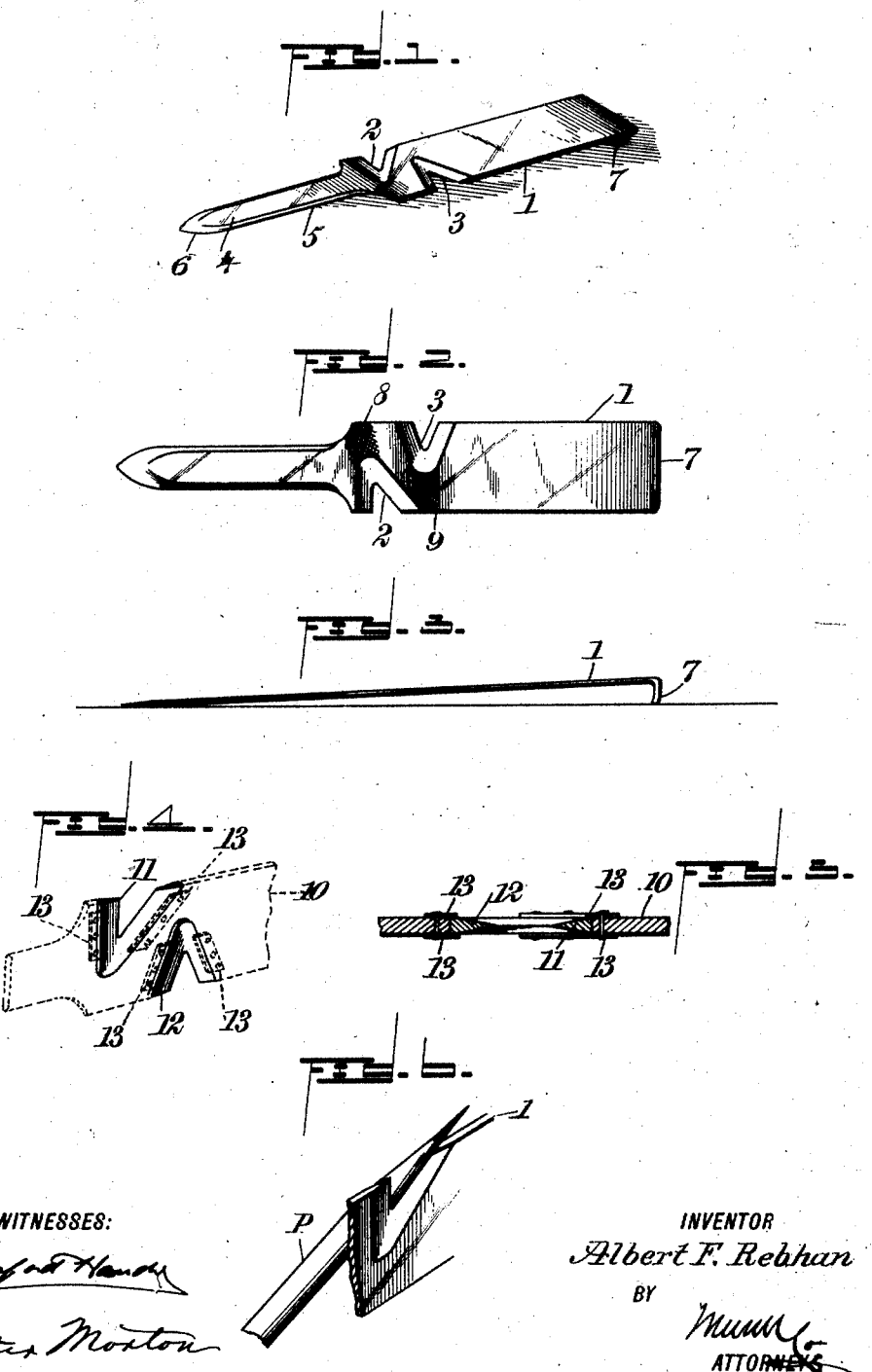

UNITED STATES PATENT OFFICE.

ALBERT F. REBHAN, OF SYRACUSE, NEW YORK, ASSIGNOR OF ONE-HALF TO DANIEL O'CONNELL, OF SYRACUSE, NEW YORK.

COMBINED LETTER-OPENER, PENCIL-SHARPENER, AND ERASER.

SPECIFICATION forming part of Letters Patent No. 776,938, dated December 6, 1904.

Application filed April 9, 1904. Serial No. 202,375. (No model.)

*To all whom it may concern:*

Be it known that I, ALBERT F. REBHAN, a citizen of the United States, and a resident of Syracuse, in the county of Onondaga and State of New York, have invented a new and Improved Combined Letter-Opener, Pencil-Sharpener, and Eraser, of which the following is a full, clear, and exact description.

This invention relates to a combined letter-opener, pencil-sharpener, and eraser; and the object of the invention is to provide a small, compact, serviceable, and inexpensive implement of the character specified which may be conveniently carried about and which may be easily manipulated.

With the objects above stated in view the invention consists of the improved implement hereinafter described in two slightly-different forms, illustrated in the accompanying drawings, and having the novel features thereof particularly pointed out in the appended claims.

Similar parts are designated by similar characters of reference throughout the several views.

Figure 1 is a perspective view of one form of the invention. Fig. 2 is an inverted plan view of the implement shown in Fig. 1. Fig. 3 is an edge view of the implement. Fig. 4 is a view showing means for securing the pencil-sharpening blades detachably upon the handle of the implement. Fig. 5 is a sectional view of part of the implement having detachable blades, and Fig. 6 is a perspective view showing the use of the implement in sharpening a pencil.

Referring to the drawings, 1 designates the handle or body portion of the implement, which is preferably formed of thin metal—such, for example, as sheet-steel—and is provided on opposite sides near its forward end with notches 2 and 3 of slightly-different forms, the edges of the notches being beveled upon the upper and lower surfaces of the handle to present sharp cutting edges. From the forward end of the handle 1 there extends a tongue 4 of metal, which is preferably formed integral with the handle and which has a rather dull edge 5 on each side near the rear, but is sharpened to a fine cutting edge at the point 6.

At the rear end of the handle 1 a downwardly-turned lip or lug 7 is formed, which serves, as shown in Fig. 3, to raise the rear end of the implement out of contact with the surface upon which it rests, so as to facilitate the lifting of the implement.

It is desirable to provide upon the lower surface of the handle adjacent to the notches 2 and 3 roughened portions 8 and 9, the utility of which will presently appear.

The implement above described is adapted for use as a pencil-sharpener, as a letter-opener, and as an ink-eraser. When used as a pencil-sharpener, the sharpened edges of the notches 2 and 3 in the handle are used, as shown in Fig. 6, in which the pencil P is shown as being drawn obliquely through one of the notches. As the point of the pencil passes from the sharp edge of the notch it travels over one of the roughened surfaces 8 or 9, and the cutting action of the edge is supplemented by the grinding action of the roughened surface upon the lead of the pencil.

The tongue 4 of the implement serves both as a letter-opener and as an ink-eraser. The dull edges 5 near the rear end of the tongue are well adapted for opening letters, because these edges are too dull to cut without a partial tearing action and will therefore follow the fold of the envelop-flap. The sharpened point 6 of the tongue, however, is adapted to serve as an ink-eraser, and the edge is therefore made very sharp and is highly tempered.

In Figs. 4 and 5 I have illustrated another form of the invention, comprising a handle portion 10, said handle portion 10 having notches arranged in the edges thereof and detachable blades 11 and 12 of angular form secured in the notches by any suitable fastening means, as the small plates 13, which are riveted to the handle 10 adjacent to the sides of the notches. In this form of the invention the letter-opener and ink-eraser are precisely the same as in the form of the invention as first described and further description is regarded as unnecessary.

The modified form of the invention having the detachable blades set into the notches in the handle is slightly more expensive to construct than the simpler form of the invention first described; but the blades may be replaced from time to time as they become worn, and the implement may therefore be made practically everlasting.

Both forms of the invention are very small and compact and may be conveniently carried in the pocket, if desired. When the implement is laid upon a desk, the downwardly-turned lip or lug 7 at the end of the handle keeps the handle raised, so that it may be conveniently grasped by the fingers, and if the implement is thrust into a pigeonhole the lug 7 prevents the instrument from being thrust out of reach or being pushed under the contents of the pigeonhole, so as to be concealed from view.

While the forms of the invention which I have described and illustrated are provided on each side of the handle with a notch having a cutting edge, it is obvious that the implement may be made with one notch only in the handle, if preferred.

Having thus described my invention, I claim as new and desire to secure by Letters Patent—

1. An implement of the character specified, having in one side thereof a notch provided with sharpened edges, and having at one end a tongue sharpened to a fine edge at the point and to dull edges at the sides.

2. An implement of the character specified, having notches of slightly-different forms in opposite sides thereof, the notches being provided with cutting edges, and having a projecting tongue extending from the forward end of the implement.

3. An implement of the character specified, having a thin flat handle portion provided with a notch in the side and having a substantially V-shaped blade presenting an angular cutting edge disposed in one plane detachably secured in the notch at the side of the handle.

In testimony whereof I have signed my name to this specification in the presence of two subscribing witnesses.

ALBERT F. REBHAN.

Witnesses:
 GEORGE B. DOLSEN,
 LEWIS HOWLETT.